United States Patent
Jansen et al.

(10) Patent No.: US 7,878,214 B1
(45) Date of Patent: Feb. 1, 2011

(54) ULLAGE PRESSURE REGULATOR

(75) Inventors: Harvey B. Jansen, Mesa, AZ (US);
John F. Calleja, Gilbert, AZ (US);
Rickie P. Western, Gold Canyon, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 804 days.

(21) Appl. No.: 11/836,570

(22) Filed: Aug. 9, 2007

Related U.S. Application Data (60) Provisional application No. 60/821,977, filed on Aug. 10, 2006.

(51) Int. Cl.
*B67D 7/52* (2010.01)

(52) U.S. Cl. ............... 137/12; 137/14; 137/206; 137/209; 137/487.5; 220/88.3; 244/135 R; 251/129.16

(58) Field of Classification Search ............... 137/487.5, 137/12, 14, 206, 209; 251/129.15, 129.16; 220/88.3; 244/135 R
See application file for complete search history.

(56) References Cited

U.S. PATENT DOCUMENTS

| | | | |
|---|---|---|---|
| 4,982,902 A * | 1/1991 | Knapp et al. | 239/585.3 |
| 5,927,322 A * | 7/1999 | Rosenau | 137/487.5 |
| 6,250,602 B1 | 6/2001 | Jansen | |
| 6,305,401 B1 * | 10/2001 | Uehara et al. | 137/102 |
| 6,371,740 B1 | 4/2002 | Jansen | |
| 6,537,037 B2 * | 3/2003 | Ota et al. | 417/213 |
| 6,619,617 B2 * | 9/2003 | Ricco et al. | 251/129.16 |
| 6,843,271 B2 * | 1/2005 | Weldon et al. | 137/487.5 |
| 6,904,930 B2 * | 6/2005 | Susko | 137/209 |
| 2004/0074548 A1 * | 4/2004 | Acree | 137/899.4 |
| 2005/0035321 A1 * | 2/2005 | Uemura et al. | 251/129.03 |
| 2005/0284149 A1 | 12/2005 | Jansen et al. | |

* cited by examiner

*Primary Examiner*—Stephen M Hepperle
*Assistant Examiner*—William McCalister
(74) *Attorney, Agent, or Firm*—Quarles & Brady LLP (57) ABSTRACT

A system for maintaining pressure in the liquid fuel tank of a high-speed flight vehicle, such as a hypersonic flight, scramjet powered air and space vehicle, manages tank ullage using a pressure regulator coupled to the fuel tank that supplies pressurized gaseous media into the fuel tank ullage based on the internal pressure of the tank. The regulator has an on-board controller that processes tank pressure input to deliver a pulse-width modulated input signal to the coil of the on-board solenoid metering assembly. Energizing the coil drives the metering valve open against spring force. The metering assembly is contained in a removable cartridge that has a floating valve guide that is held stationary by bias of the spring against the metering valve. The metering valve has a separate valve seat that mates with the metering orifice of a flow nozzle. The valve seat can have higher compressibility than a clapper part of the valve to effect a better seal, with its compression being controlled by contact of the clapper with a rigid stop surface of the flow nozzle.

20 Claims, 6 Drawing Sheets

ULLAGE PRESSURE REGULATOR

CROSS-REFERENCE TO RELATED APPLICATION

This application claims benefit to U.S. provisional application Ser. No. 60/821,977, filed Aug. 10, 2006.

STATEMENT OF FEDERALLY SPONSORED RESEARCH OR DEVELOPMENT

This invention was made with government support under contract No. F33615-03-9-2422 awarded by the United States Air Force Research Laboratory. The government has certain rights in the invention.

BACKGROUND OF THE INVENTION

1. Technical Field

The present invention relates to pressure regulation, and in particular, to systems and devices that regulate the internal pressure of liquid fuel tanks in high-speed air and space flight vehicles.

2. Description of the Related Art

Flight vehicles that travel at very high altitudes and into the earth's atmosphere require high-rate combustion engines in order to achieve the hypersonic velocities necessary for such flights, generally in range of Mach 4-10. One type of engine for propelling flight vehicles of this type is a supersonic combustion ramjet ("scramjet") engine. Proper fuel delivery to the engine is critical for any flight vehicle to avoid unintended engine shutdown and failure. However, the high rate at which fuel is combusted in scramjet engines makes fuel delivery a significant challenge both at ignition and during sustained operation. The extreme pressure and temperature environment common in such high-speed applications further complicate fuel delivery.

Valves for metering fuel and other combustible media to engines in aircraft and spacecraft are known in the art, see e.g., U.S. Pat. No. 6,250,602 B1, assigned to the assignee of the present invention. Such valves are capable of accurately and precisely controlling high flow pressurized fuel supply to the engine combustion chamber(s).

Even precision metering valves, however, can lose the ability to accurately meter fuel if pressure loss occurs upstream from the valve, such as if pressure is lost to the primary fuel pump arising from instability in the fuel tank. In liquid fuel systems there is a vacuous space within the fuel tank, known as ullage, where no liquid fuel is present. The ullage varies constantly as fuel is burned during operation of the engine. This change in ullage can cause the internal tank pressure to vary and possibly drop below a minimum pressure level. Should fuel pressurization drop excessively accurate fuel delivery to the engine(s) could be affected and engine performance could be compromised or possibly not sustained.

Pressure regulators have been devised to stabilize the pressure of a fuel tanks, and are generally classified by the actuator mechanism being mechanically or electronically driven. Known mechanical regulators are typically designed for relieving excess pressure and use a simple spring and piston arrangement to open internal space to ambient or other relief lines. Mechanical regulators can be imprecise, particularly at high pressure conditions, due to the effects of large frictional forces and hysteresis. Multiple stages may also be required for large pressure range applications, which add complexity, size and weight to the regulator and further impair accuracy and reliability. Moreover, mechanical regulators generally provide a single pressure set point, which is either fixed or can be varied only by mechanical adjustment to the regulator.

Known electronic regulators, on the other hand, generally can be configured to build up or relieve pressure within a range of pressures in response to electrical input. The set point can be varied easily and the unit size and weight is generally favorably compared to mechanical regulators because of the electronic actuation. Electronic controllers can output pressure in proportion to an electrical input essentially unaffected by changes in supply pressure so that the regulator can provide accurate, high-resolution control of pressure at low flow conditions. However, the inaccuracy of known electronic regulators, particularly at high flow rates, can be unacceptably high for critical applications, such as the fuel systems of high-speed flight vehicles.

Moreover, for any flight vehicle, especially hypersonic vehicles, it is critical to minimize the size and weight of on-board systems. The size and weight of the fuel system can be significantly lessened by using a high energy density fuel tank pressurant system and a low energy density fuel tank made of thinner walls than would be necessary under high pressure. However, this requires the regulator to perform over a very large pressure drop, in the range of 5,000 psia for example, which can be too great for conventional regulators to handle while maintaining accuracy.

SUMMARY OF THE INVENTION

The present invention provides a smart pressure regulator for fuel systems, such as for supersonic or hypersonic flight vehicles, that manages fuel tank ullage to maintain internal tank pressure during operation of the vehicle. By processing tank pressure feedback data a controller on-board the regulator meters pressurant, such as gaseous Nitrogen, into the tank ullage to maintain the internal pressure of the fuel tank. The regulator has a unique metering section that accurately meters the pressurant in response to an input signal from the controller.

Specifically, in one aspect the invention provides an ullage pressure regulator for a fuel tank. The regulator has a body with an inlet for communication with a pressurant and an outlet for communication with the fuel tank ullage. A metering assembly within the body has a movable metering valve arranged to vary the opening of a metering orifice disposed between the inlet and the outlet. A controller within the body receives a pressure signal corresponding to a pressure value inside the fuel tank. The controller processes the pressure signal relative to a control pressure value. The controller sets an input signal according to the pressure value relative to the control pressure value. The controller sends the input signal to a coil within the body to position the metering valve with respect to the metering orifice accordingly.

In another form, the invention can also provide an ullage pressure regulator for maintaining pressurization of a liquid fuel tank of a high-speed flight vehicle in which the metering assembly has a coil receiving an input signal to drive a metering valve with respect to a metering orifice and thereby control flow from the inlet to the outlet. A guide can be disposed within a center for guiding movement of the metering valve. The metering valve moves against the bias of a spring. The guide can be free floating, that is not fixedly mounted, but held stationary by the spring biased against the metering valve.

The metering valve and the coil can be part of a valve cartridge that removably mounts to the body. The valve cartridge would also include the guide and spring in one compact, easy to assemble unit. The valve member can be a clapper with a narrow, elongated stem. A separate valve seat can be mounted at an opening in the clapper for mating with metering orifice. The valve seat can thus be of a different material, such as a material having greater compressibility, than the clapper to provide improved sealing. The metering orifice can be formed in a flow nozzle, which can cooperate with the clapper to provide a rigid compression stop so that compression of the seat is controlled to a prescribed extent and thus not damaged.

In another aspect the invention provides a system for regulating the pressure within a fuel tank holding liquid fuel. A pressure transducer is mounted in communication with the fuel tank ullage for measuring an interior pressure of the fuel tank and providing a corresponding pressure signal. A regulator as described above has an inlet communicating with a gaseous pressurant and an outlet communicating with the fuel tank ullage. The regulator's controller receives the pressure signal from the pressure transducer, processes the pressure signal relative to a control pressure value and sets the input signal to the coil of the metering assembly based on the value of the pressure signal relative to the control pressure value.

In yet another aspect the invention provides a method of maintaining pressurization of a fuel tank during consumption of the liquid fuel contained within the fuel tank by managing tank ullage. In particular, a regulator, having an on-board controller and an electronically actuated metering assembly, is coupled to the fuel tank. The pressure within the fuel tank ullage is detected, and a pressure signal corresponding to the pressure of the fuel tank is sent to the controller. The controller processes the pressure signal relative to a control pressure value and provides an input signal to the metering assembly based on the pressure value relative to the control pressure value. The regulator meters pressurant into the fuel tank ullage.

The present invention thus provides a device and system for managing the ullage of a fuel tank to maintain a set internal pressure within the fuel tank within very narrow limits, such as plus/minus 1.5 percent of the set point. The regulator is capable of maintaining low internal pressure set points within such narrow tolerances with very high input pressure, being operable across a pressure drop of approximately 5,000 psia. By accurately detecting the actual internal pressure of the tank and sending the regulator an associated input signal, the on-board electronics of the regulator are able to precisely control it's metering assembly to close off or open up flow of pressurized media to the fuel tank ullage based on the pressure feedback of the fuel tank. Precision and accuracy can be achieved using a pulse-width modulating control in a closed-loop system.

These and still other advantages of the invention will be apparent from the detailed description and drawings. What follows is one or more embodiments in which the present invention can be carried out. To assess the full scope of the invention the claims should be looked to as the described embodiment(s) are not intended as the only embodiment(s) within the scope of the invention.

DETAILED DESCRIPTION OF EMBODIMENT(S) OF THE INVENTION

The present invention provides a smart pressure regulator for fuel systems, such as for air and space flight vehicles, that manages fuel tank ullage conditions to maintain internal tank pressure during operation of the vehicle. By processing tank pressure feedback data a controller on-board the regulator meters pressurant, such as gaseous Nitrogen, as needed into the tank ullage to maintain internal pressure. The regulator has a unique metering section that accurately meters the pressurant in response to an input signal from the controller.

Figure 1:
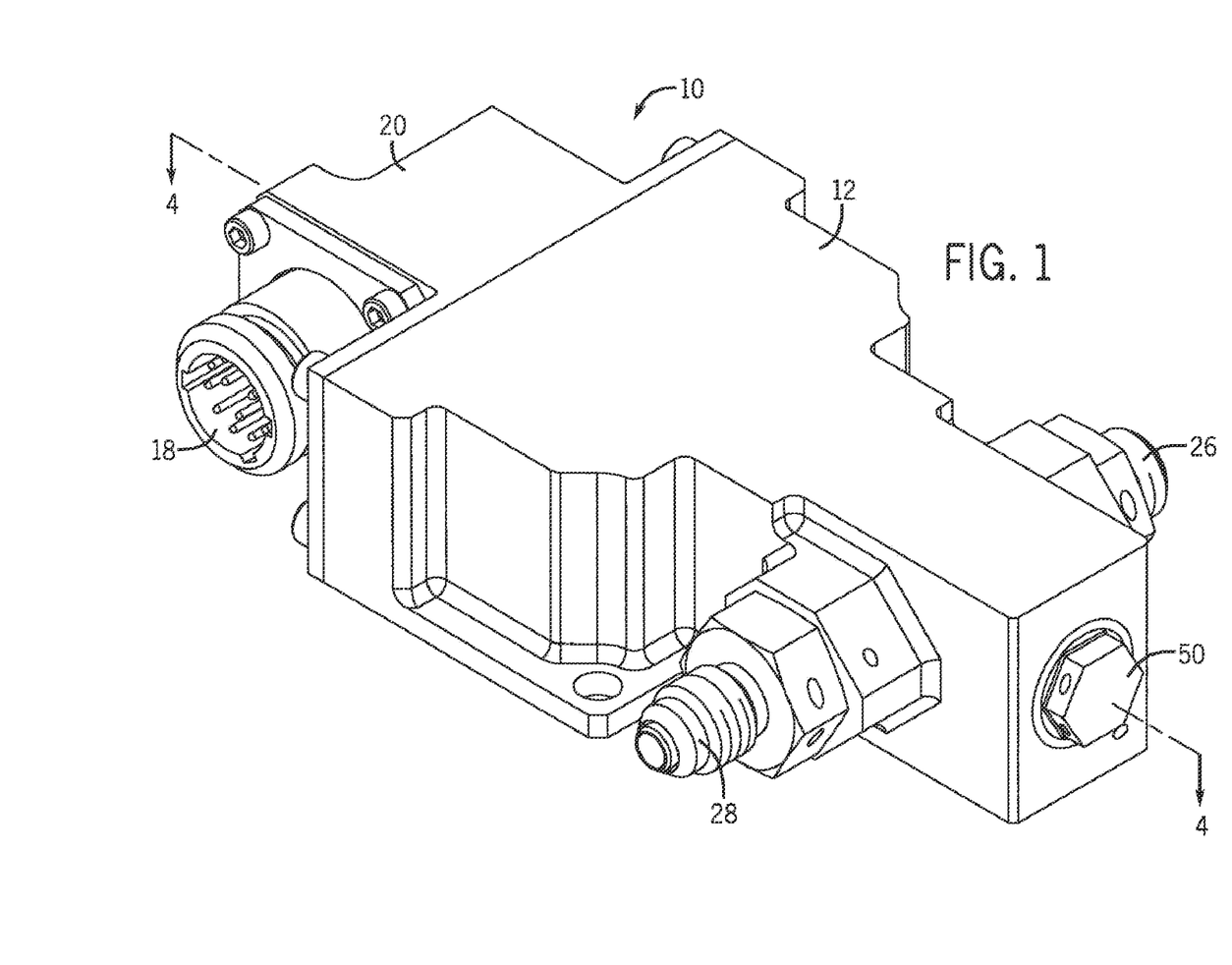
FIG. 1 is a perspective view of an ullage pressure regulator suitable to maintain pressurization of a liquid fuel tank for high-speed air and space flight vehicles according to the present invention.
Figure 2:
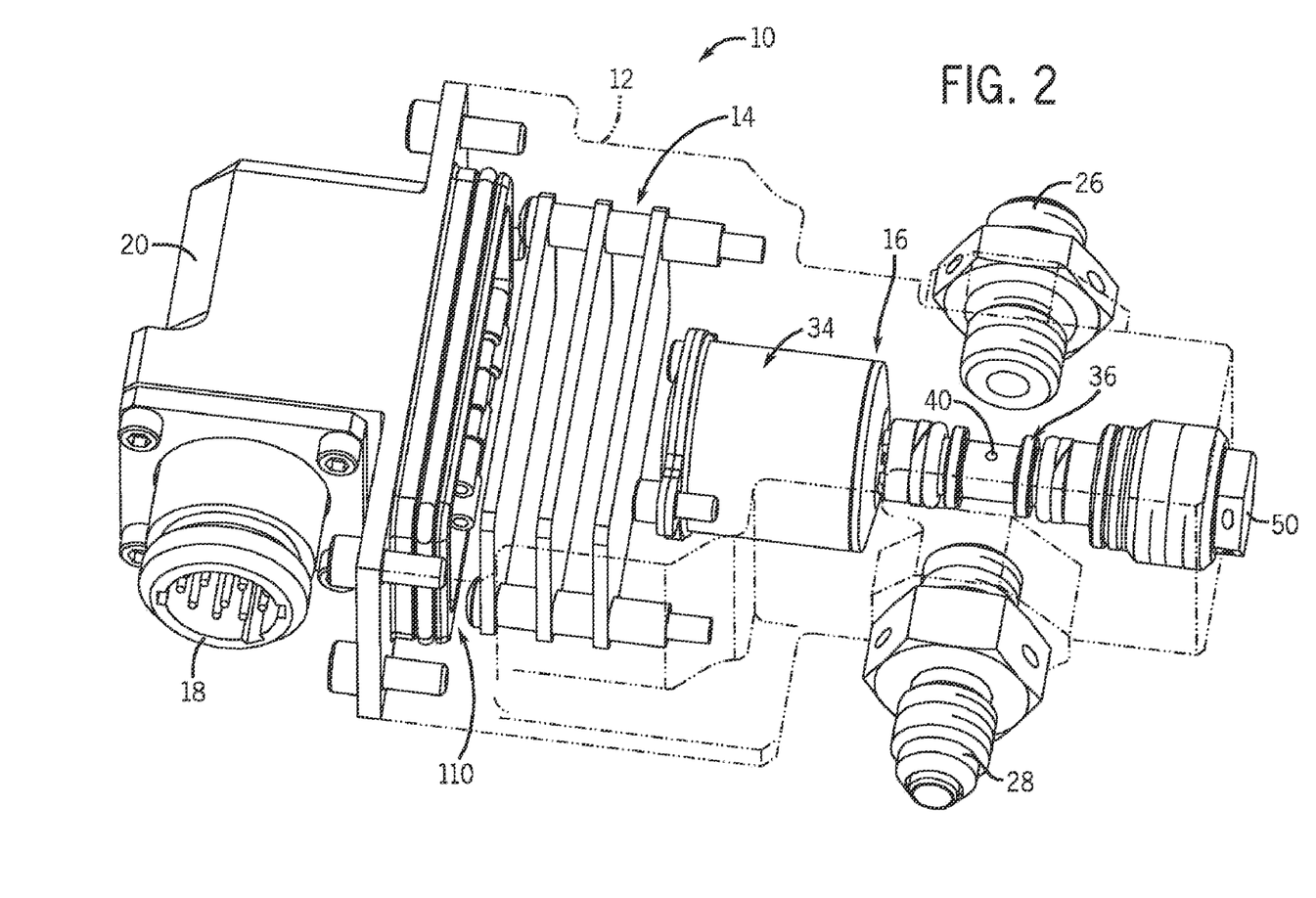
FIG. 2 is another perspective view of the regulator of FIG. 1 with the housing body shown in phantom.
Figure 4:
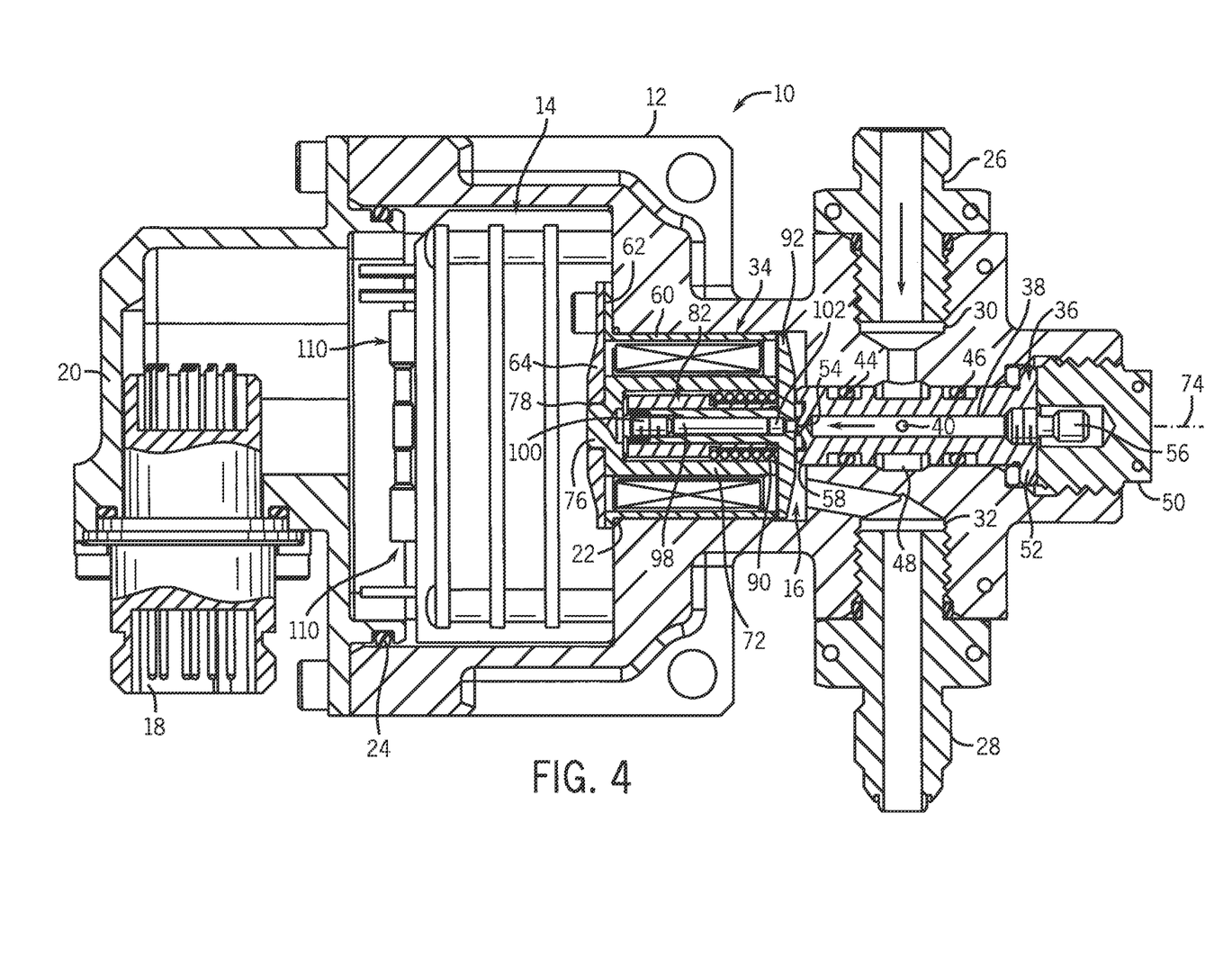
FIG. 4 is a sectional view taken along line 4-4 of FIG. 1.

The regulator 10 is shown generally in FIGS. 1, 2 and 4. The regulator 10 includes a housing body 12 for containing an electronics section 14 and a metering section 16. The electronics section 14 is electrically coupled to the fuel control system via a standard electrical connector 18 mounted in a small housing 20 that is mounted to the housing body 12. The electronics section 14 is sealed at both ends via seals 22 and 24. Standard inlet 26 and outlet 28 fittings also mount to the housing body 12 at respective inlet 30 and outlet 32 ports to be in communication with the metering section 16.

Figure 6:
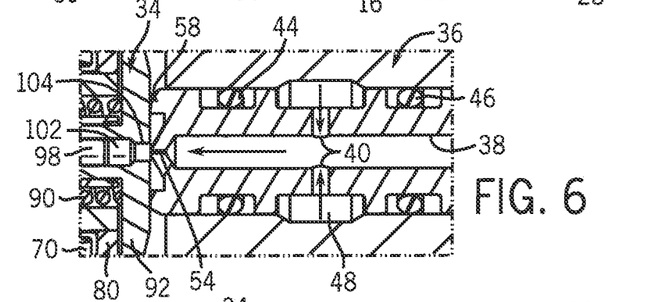
FIG. 6 is a sectional view taken along line 6-6 of FIG. 5 showing inlet flow passageways of a flow nozzle within the regulator.

Referring to FIG. 4, the metering section 16 includes a valve cartridge 34 and a flow nozzle 36. The flow nozzle 36 is a small barrel-like piece that defines the primary flow passageway 38 leading from the inlet port 30 to the valve cartridge 34. Specifically, as shown in FIG. 6, flow from the inlet port 30 is fed into the primary passageway 38 via two small transverse passageways 40 that intersect the primary passageway 38 at right angles. Two seals 44 and 46 supported by back-up rings keep flow from escaping an annular channel 48 about the flow nozzle 36. With reference to FIG. 4, the primary passageway 38 is plugged at the free end by a puller plug 56 having a threaded end for attaching a puller for removing the flow nozzle 36. The puller plug 56, and the flow nozzle 36, can be accessed and removed by removing a threaded nut 50, which threads to the housing body 12 from the outside and secures the flow nozzle 36 in place by abutment with an end flange 52. At the opposite end, the flow nozzle 36 defines a metering orifice 54. The metering orifice 54 is located in axial alignment with the primary passageway 38 and terminates at the center of a projecting conical surface and is spaced radially from a ring-shaped stop 58 projecting from the flow nozzle 36 and circumscribing the metering orifice 54.

Figure 3:
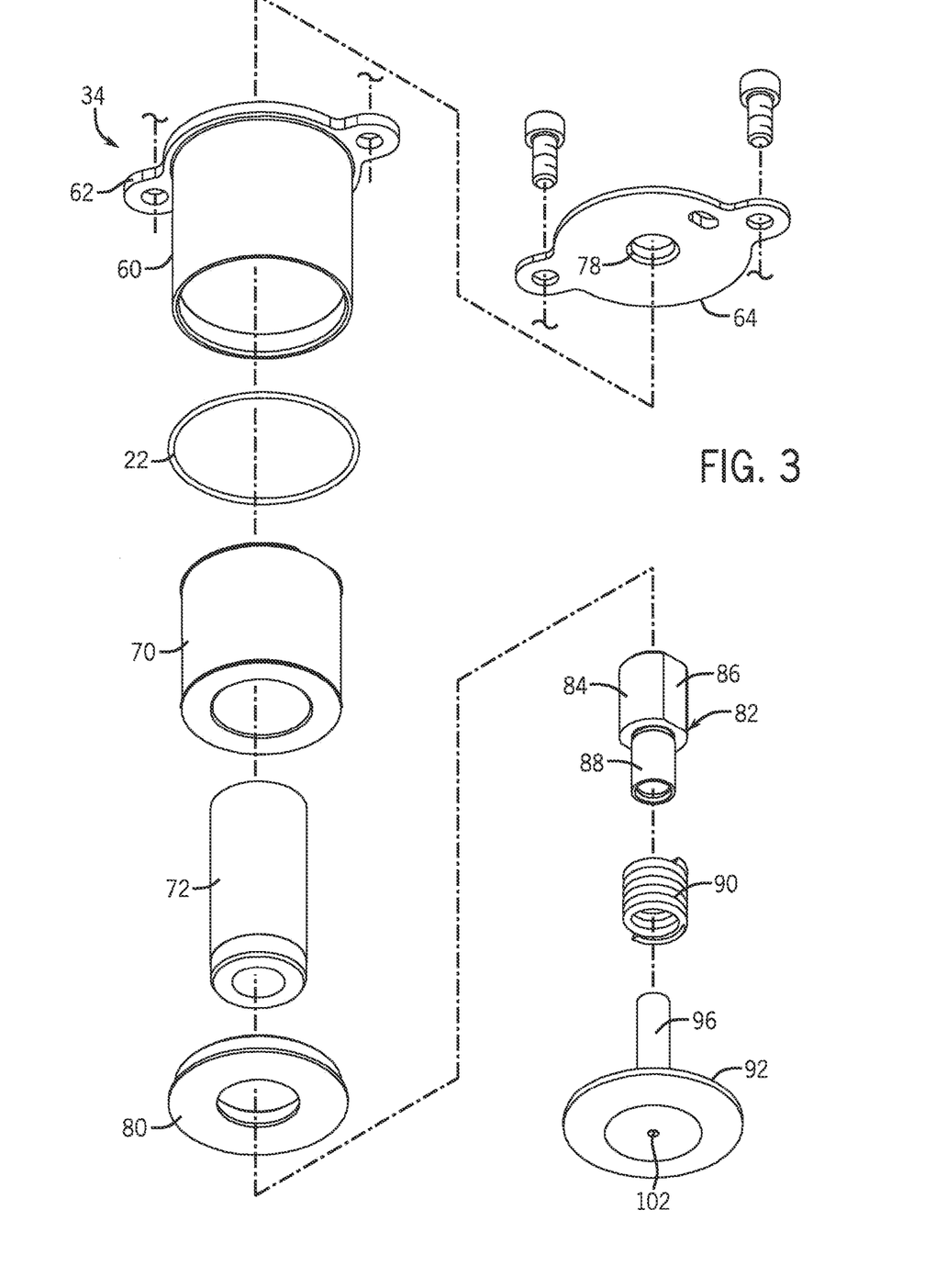
FIG. 3 is an exploded assembly view showing a valve cartridge thereof.

Flow through the metering orifice 54, and thus from the inlet fitting 26 to the outlet fitting 28 of the regulator 10, is controlled by operation of the valve cartridge 34. Referring to FIGS. 3 and 4, the valve cartridge 34 includes a cartridge body 60 that is closed at its non-metering flanged end 62 by a magnetically conductive end cap 64. The flanged end 62 and the end cap 64 reside at the electronics section 14 and bolt to an internal wall of the housing body 12 to secure the valve cartridge 34 in place and to compress seal 22 to isolate the electronics section 14 from the metering section 16. The remainder of the cartridge body 60 extends axially into the metering section 16 to contain an electromagnet coil 70 annularly disposed about a bobbin 72 situated in the metering section 16, inside the cartridge body 60 so as to be concentric about a stroke axis 74 extending through the center of the primary passageway 38. At one end, the bobbin 72 has a boss 76 that fits into a guide opening 78 in the end cap 64, and at the other end the bobbin 72 is open and fits inside an annular coil cover 80 mounted to the cartridge body 60 to retain the coil 70. The coil cover 80 acts as a reluctor in that it is magnetically inert.

Inside the bobbin 72 fits a guide 82. The guide 82 is hollow and open-ended with an elongated body having enlarged annular section 84 with flats 86 and a narrowed annular section 88. The guide 82 is not fixed in place and is free-floating, but is held stationary by the force exerted from a spring 90 coiled about the narrowed annular section 88 of the guide 82 acting against the shoulder of the enlarged annular section 84. The opposite end of the spring 90 abuts a back surface of a clapper 92 having an elongated hollow stem 96 that extends along the stroke axis 74 within the guide 82. Inside the stem 96 is a coupler pin 98 retained by a threaded retainer 100 threaded into the stem 96. The retainer 100 forces the coupler pin 98 against a small valve seat 102 that projects out through a small opening 104 in the center of the clapper 92 and beyond the adjacent surface thereof. The valve seat 102 is aligned with and larger than the metering orifice 54 so as to be able to occlude the metering orifice 54 and seal off flow therethrough when abutting the flow nozzle 36. The valve seat 102 can be made of a material with improved sealing characteristics over the rest of the clapper 92, such as being "softer" or having more compressibility. While other materials may be suitable, Kel-F®, a homopolymer of chlorotrifluoroethylene, and Vespel®, a polymide based polymer, are known to be acceptable materials for critical sealing applications in high temperature environments.

When the valve seat 102 engages the flow nozzle 36 the valve seat 102 closes off the metering orifice 54 and compresses under force. The ring stop 58 of the flow nozzle 36 impedes movement of the clapper 92 to control compression of the valve seat 102, and thereby prevent damage from over compression of the valve seat 102. The position of the valve seat 102 is made to change by axial translation of the clapper 92 within the guide 82, which moves from a closed position shown in FIG. 5 to a fully open position shown in FIG. 7. In the embodiment shown in the figures, the spring 90 works against the opening of the clapper 92 and thereby creates a normally closed valve arrangement. The spring 90 thus serves to both return the clapper 92 to reseat the valve seat 102 as well as to keep the guide 82 stationary.

The coil 70 and clapper 92 form a solenoid arrangement by virtue of the coil cover 80 being magnetically inert and the magnetic pathway being completed by the clapper 92. Movement of the clapper 92 is controlled by the controller, which is referred to wherein by numeral 110 referring to the circuit boards carrying control electronics in the sealed electronics section 14 of the regulator 10. The controller 110 sends pulse-width modulated input signals to the coil 70 to pull on the clapper 92 axially against the spring 90, and thereby unseat the valve seat 102 from the metering orifice 54.

Figure 5:
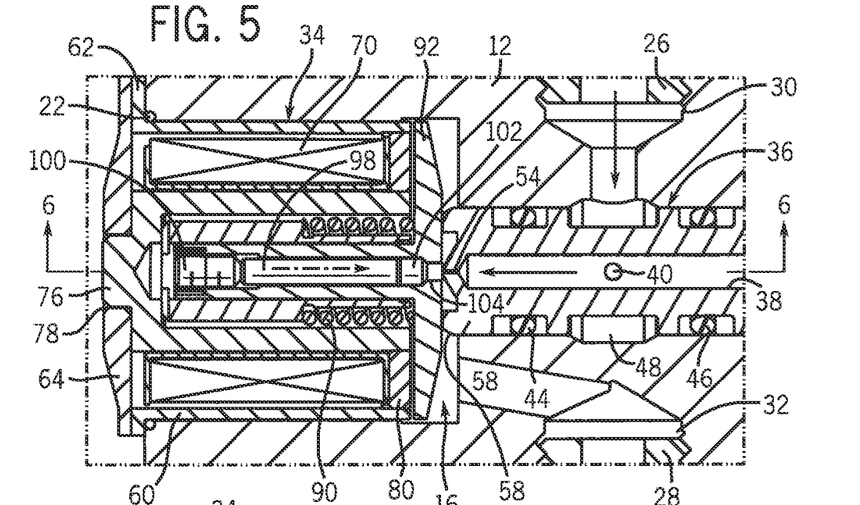
FIGS. 5 and 7 are enlarged partial sectional views showing the regulator with the metering valve in respective normally closed and open positions.
Figure 7:
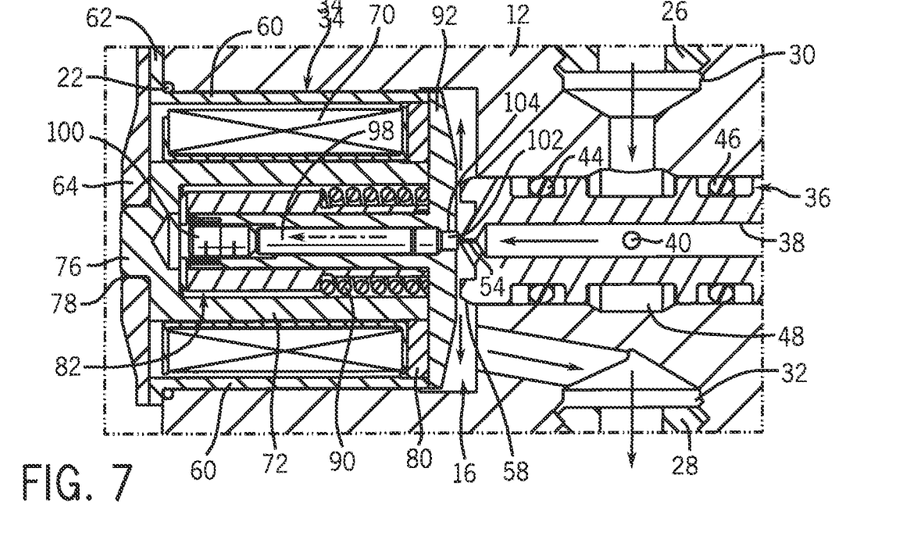

FIGS. 5-7 illustrate the flow path through the regulator 10. Specifically, media enters the housing body 12 from a line connected to the inlet fitting 26. Media flows from there to the annular channel 48 and through internal routing into the small transverse passageways 40 of the flow nozzle 36 and then through the primary passageway 38 to the metering orifice 54, as shown by the arrows in FIG. 6. When the clapper 92 is in the closed position of FIG. 5, the media does not flow from the flow nozzle 36. As the clapper 92 moves away from the flow nozzle 36 the valve seat 102 unseats and media flows from the flow nozzle 36 through the metering orifice 54. Media can flow past and through the valve cartridge 34 on its way through downstream routing and out of the housing body 12 through the outlet fitting 28, as shown by the arrows in FIG. 7. The clapper 92 is thus pressure balanced by virtue of the media acting on both large, axially spaced sides of the clapper 92. Like the electronics section 14, the coil 70 is in an unpressurized cavity free of working media due to the coil cover 80 being brazed to the metering side of the cartridge body 60 and the bobbin 72, and thereby sealing off the coil 70.

The regulator 10 can be used with any suitable media brought into the housing body 12 either from a dedicated supply or from another subsystem. In hypersonic flight vehicles it is critical for space and weight to be minimized to the extent possible. Thus, in an exemplary hypersonic vehicle application powered by a scramjet engine, a high energy pressurant system is employed so that the fuel tank can operate with low internal pressures, and thereby can be made of lighter, thin-walled construction. Specifically, the pressurant, for example gaseous Nitrogen, is held in a small form-factor bottle container and is highly compressed, for example to 4,800 psia. The fuel tank holds any suitable fuel, for example a hydrogen-based liquid jet fuel, such as JP-7.

Figure 8:
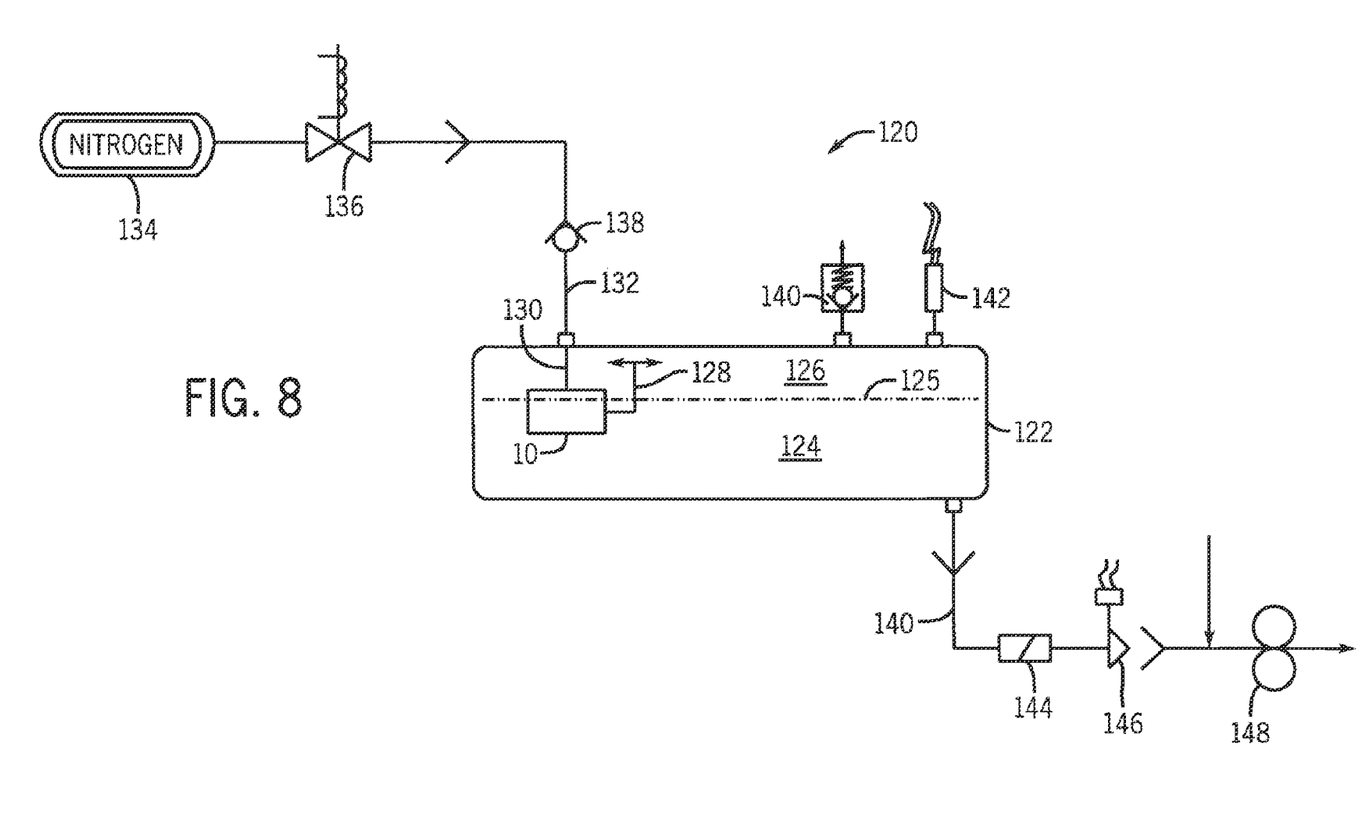
FIG. 8 is a schematic diagram of an exemplary fuel system of a scramjet engine flight vehicle.

An exemplary scramjet engine fuel system 120 is illustrated schematically in FIG. 8. The system 120 includes a fuel tank 122 containing liquid fuel 124 and in which the regulator 10 is mounted partially submerged. The space above the fuel level line 125 represents the tank ullage 126. A line 128 coupled to the outlet fitting 28 of the regulator 10 opens to the tank ullage 126. Another line 130 couples to a supply line 132 coming from a pressurant tank 134 through intermediate shut-off 136 and check 138 valves. A tank relief valve 140 and a pressure transducer 142 are coupled to the fuel tank 122 in communication with the tank ullage 126. An outlet line 140 is coupled to the bottom of the fuel tank 122 in communication with the liquid fuel 124. The outlet line 140 leads to the combustion zones of the engine (not shown) through a filter 144, a metering valve 146 and a pump 148.

The pressure transducer 142 is electrically connected to the controller 110, either directly or via a master or fuel control system bus (not shown). The pressure transducer 142 detects the actual pressure within the fuel tank 122 and relays an associated input signal to the controller 110 inside the regulator 10. The controller 110 processes the pressure signal from the pressure transducer 142, for example by comparing that signal to a control pressure value corresponding to the desired internal pressure set point of the fuel tank 122. When the tank pressure is below the control pressure set point, under closed-loop operation, the controller 110 sends a pulse-width modulated command signal to the coil 70 to move the clapper 92 off of the metering orifice 54 and allow the pressurant to flow into the tank ullage 126. The controller 110 continues to monitor the pressure signals from the pressure transducer 142, and selectively energizes the coil 70 as needed to maintain the internal pressure set point within a very narrow tolerance. The controller 110 can vary energization of the coil 70 discretely over time as needed according to the pressurant flow demands of the fuel tank 122. Should tank pressure rise to a prescribed crack pressure, higher than the set point pressure, the relief valve 140 can open to relieve pressure within the fuel tank 122.

During empirical testing, the regulator 10 and system of the present invention were able to maintain a set point tank pressure of 7.25 psia within +0.2 to −0.0 psia, or roughly +/−1.5%. This was achieved over an approximately 675 second time period in which the mass flow rate of the pressurant varied discretely from high volume (at 4,800 psia, 100° F.) to low volume (at approximately 550 psia, 40° F.). During an initial portion of the time period corresponding to low tank ullage, the regulator 10 was cycled so that the metering orifice 54 was mostly closed (coil 70 de-energized) for the majority of the time, and as tank ullage increased toward the end of the time period, the regulator 10 was cycled so that the metering orifice 54 was mostly open (coil 70 energized). The time-averaged mass flow rate of the pressurant, however, was essentially constant through the entire time period.

The present invention thus provides a device and system for managing the ullage of a fuel tank to maintain a set internal pressure within the fuel tank within very narrow limits, such as plus/minus 1.5 percent of the set point. The regulator is capable of maintaining low internal pressure set points within narrow tolerances at very high input pressures, being operable across a pressure drop of approximately 5,000 psia. By accurately detecting the actual internal pressure of the tank and sending the regulator an associated input signal, the on-board electronics of the regulator are able to precisely control it's metering assembly to close off or open up flow of pressurized media to the fuel tank ullage based on the pressure feedback of the fuel tank. Precision and accuracy can be achieved using a pulse-width modulating control in a closed-loop system.

It should be appreciated that one embodiment of the invention has been described above. However, many modifications and variations to the described embodiment will be apparent to those skilled in the art, which will be within the spirit and scope of the invention. Moreover, the described scramjet engine application is only one of the many uses for the valve of the present invention. Therefore, the invention should not be limited to the described embodiment. To ascertain the full scope of the invention, the following claims should be referenced.

We claim:

1. An ullage pressure regulator for a fuel tank, the regulator comprising:
    a body with an inlet for communication with a pressurant and an outlet for communication with a fuel tank ullage;
    a metering assembly disposed within the body and having a movable metering valve arranged to vary the opening of a metering orifice disposed between the inlet and the outlet, wherein the metering valve has a disk-shaped clapper with an elongated stem and has a separate valve seat mounted at an opening in the clapper for mating with the metering orifice;
    a coil disposed within the body and arranged to magnetically interact with the clapper to vary the position of the valve seat with respect to the metering orifice according to an input signal; and
    a controller disposed within the body and receiving a pressure signal corresponding to a pressure value inside the fuel tank, the controller processing the pressure signal relative to a control pressure value and setting the input signal to the coil based on the pressure value relative to the control pressure value.

2. The regulator of claim 1, wherein the pressurant is gaseous Nitrogen and the fuel is liquid jet fuel.

3. The regulator of claim 1, wherein the metering valve and the coil are part of a valve cartridge removably mounted to the body.

4. The regulator of claim 3, wherein the valve cartridge includes a guide in which the metering valve is received and a spring biasing the guide away from the metering valve.

5. The regulator of claim 4, wherein the guide is free floating within the valve cartridge and held in a stationary position by the spring.

6. The regulator of claim 4, wherein the spring biases the metering valve toward the metering orifice.

7. The regulator of claim 4, wherein the guide extends through a center of the coil.

8. The regulator of claim 1, wherein the clapper has an enlarged portion that extends radially outward of the stem.

9. The regulator of claim 1, wherein the stem has a hollow bore receiving a coupler pin.

10. The regulator of claim 9, wherein the valve seat is a different material than the clapper.

11. The regulator of claim 9, further including a retainer mounted to the stem and securing the coupler pin into engagement with the valve seat.

12. The regulator of claim 1, further including a flow nozzle disposed within the body and defining the metering orifice.

13. The regulator of claim 12, wherein the flow nozzle defines a stop spaced from the metering orifice for engaging the clapper of the metering valve and controlling compression of the valve seat.

14. The regulator of claim 8, wherein the clapper is separated from the coil by a magnetically inert piece.

15. An ullage pressure regulator for maintaining pressurization of a liquid fuel tank of a high-speed flight vehicle, the regulator comprising:
    a body with an inlet for communication with a gaseous pressurant and an outlet for communication with a fuel tank ullage;
    a metering assembly within the body having a coil receiving an input signal to drive a metering valve with respect to a metering orifice and thereby control flow from the inlet to the outlet, wherein a guide receiving the metering valve is disposed within a center of the coil and held stationary by a spring biased against movement of the metering valve, wherein the metering valve has a disk-shaped clapper with an elongated stem and has a separate valve seat mounted at an opening in the clapper for mating with the metering orifice, and wherein the coil magnetically interacts with the clapper to vary the position of the valve seat with respect to the metering orifice according to an input signal; and
    a controller within the body setting the input signal to the coil based on the pressure value of the fuel tank.

16. The regulator of claim 15, wherein the controller processes a pressure signal corresponding to the pressure value of the fuel tank relative to a control pressure value.

17. A system for regulating the pressure within a fuel tank holding liquid fuel, the system comprising:
    a pressure transducer mounted in communication with a fuel tank ullage for measuring a pressure of the fuel tank and providing a corresponding pressure signal;
    a regulator having:
    a body with an inlet for communication with a gaseous pressurant and an outlet for communication with a fuel tank ullage;
    a metering assembly within the body and having a movable metering valve arranged to vary the opening of a metering orifice disposed between the inlet and the outlet, wherein the metering valve has a disk-shaped clapper with an elongated stem and has a separate valve seat mounted at an opening in the clapper for mating with the metering orifice;
    a coil assembly within the body arranged to magnetically interact with the clapper to vary the position of the valve seat with respect to the metering orifice according to an input signal; and
    a controller within the body receiving the pressure signal from the pressure transducer, the controller processing the pressure signal relative to a control pressure value and setting the input signal to the coil assembly based on the value of the pressure signal relative to the control pressure value.

18. The system of claim 17, wherein the metering assembly includes a metering valve guide held stationary by a spring that is biased against movement of the metering valve.

19. A method of using an ullage pressure regulator according to claim 1 for maintaining pressurization of a fuel tank during consumption of the liquid fuel contained within the fuel tank by managing tank ullage conditions, comprising:

coupling the regulator to the fuel tank, the regulator having the on-board controller and the electronically actuated metering assembly;

detecting the pressure value within the fuel tank ullage;

sending the pressure signal to the controller which corresponds to the pressure value;

the controller processing the pressure signal relative to the control pressure value and providing the input signal to the metering assembly based on the pressure value relative to the control pressure value; and the regulator metering pressurant into the fuel tank ullage.

20. The method of claim 19, wherein the metering assembly of the regulator includes a guide that receives the movable metering valve, wherein the guide is held stationary by a spring biased against movement of the metering valve.

* * * * *

UNITED STATES PATENT AND TRADEMARK OFFICE
CERTIFICATE OF CORRECTION

| | | |
|---|---|---|
| PATENT NO. | : 7,878,214 B1 | |
| APPLICATION NO. | : 11/836570 | |
| DATED | : February 1, 2011 | |
| INVENTOR(S) | : Harvey B. Jansen et al. | |

It is certified that error appears in the above-identified patent and that said Letters Patent is hereby corrected as shown below:

The Title page, showing an illustrative figure, should be deleted and substitute therefor the attached Title page.

Please replace the figures in the issued patent with the figures in the accompanying Replacement Sheets. (see attached)

Signed and Sealed this
Seventh Day of June, 2011

David J. Kappos
*Director of the United States Patent and Trademark Office*

(12) United States Patent
Jansen et al.

(10) Patent No.: US 7,878,214 B1
(45) Date of Patent: Feb. 1, 2011

(54) ULLAGE PRESSURE REGULATOR

(75) Inventors: Harvey B. Jansen, Mesa, AZ (US);
John F. Calleja, Gilbert, AZ (US);
Rickie P. Western, Gold Canyon, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 804 days.

(21) Appl. No.: 11/836,570

(22) Filed: Aug. 9, 2007

Related U.S. Application Data (60) Provisional application No. 60/821,977, filed on Aug. 10, 2006.

(51) Int. Cl.
*B67D 7/52* (2010.01)
(52) U.S. Cl. ............... 137/12; 137/14; 137/206; 137/209; 137/487.5; 220/88.3; 244/135 R; 251/129.16
(58) Field of Classification Search ........... 137/487.5, 137/12, 14, 206, 209; 251/129.15, 129.16; 220/88.3; 244/135 R
See application file for complete search history.

(56) References Cited

U.S. PATENT DOCUMENTS

| | | | |
|---|---|---|---|
| 4,982,902 A * | 1/1991 | Knapp et al. | 239/585.3 |
| 5,927,322 A * | 7/1999 | Rosenau | 137/487.5 |
| 6,250,602 B1 | 6/2001 | Jansen | |
| 6,305,401 B1 * | 10/2001 | Uehara et al. | 137/102 |
| 6,371,740 B1 | 4/2002 | Jansen | |
| 6,537,037 B2 * | 3/2003 | Ota et al. | 417/213 |
| 6,619,617 B2 * | 9/2003 | Ricco et al. | 251/129.16 |
| 6,843,271 B2 * | 1/2005 | Weldon et al. | 137/487.5 |
| 6,904,930 B2 * | 6/2005 | Susko | 137/209 |
| 2004/0074548 A1 * | 4/2004 | Acree | 137/899.4 |
| 2005/0035321 A1 * | 2/2005 | Uemura et al. | 251/129.03 |
| 2005/0284149 A1 | 12/2005 | Jansen et al. | |

* cited by examiner

*Primary Examiner*—Stephen M Hepperle
*Assistant Examiner*—William McCalister
(74) *Attorney, Agent, or Firm*—Quarles & Brady LLP

(57) ABSTRACT

A system for maintaining pressure in the liquid fuel tank of a high-speed flight vehicle, such as a hypersonic flight, scramjet powered air and space vehicle, manages tank ullage using a pressure regulator coupled to the fuel tank that supplies pressurized gaseous media into the fuel tank ullage based on the internal pressure of the tank. The regulator has an onboard controller that processes tank pressure input to deliver a pulse-width modulated input signal to the coil of the onboard solenoid metering assembly. Energizing the coil drives the metering valve open against spring force. The metering assembly is contained in a removable cartridge that has a floating valve guide that is held stationary by bias of the spring against the metering valve. The metering valve has a separate valve seat that mates with the metering orifice of a flow nozzle. The valve seat can have higher compressibility than a clapper part of the valve to effect a better seal, with its compression being controlled by contact of the clapper with a rigid stop surface of the flow nozzle.

20 Claims, 6 Drawing Sheets